US009330647B1

(12) United States Patent
Bay et al.

(10) Patent No.: US 9,330,647 B1
(45) Date of Patent: May 3, 2016

(54) DIGITAL AUDIO SERVICES TO AUGMENT BROADCAST RADIO

(75) Inventors: Daniel C Bay, Santa Clara, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 743 days.

(21) Appl. No.: 13/529,723

(22) Filed: Jun. 21, 2012

(51) Int. Cl.
*H04H 20/71* (2008.01)
*G10H 1/00* (2006.01)

(52) U.S. Cl.
CPC .................................... *G10H 1/0025* (2013.01)

(58) Field of Classification Search
CPC ........................ G10H 1/0025; G10H 2230/015
USPC ................ 455/3.01–3.06, 414.1–414.4, 445, 455/419–421, 412.1, 412.2, 426.1, 426.2, 455/456.1–456.7, 550.1, 500, 517; 725/62–72
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2003/0163823 | A1* | 8/2003 | Logan et al. ..................... 725/89 |
| 2008/0082510 | A1* | 4/2008 | Wang et al. ........................ 707/3 |
| 2010/0332296 | A1* | 12/2010 | Gharabally .................. 705/14.2 |
| 2011/0072955 | A1* | 3/2011 | Turner .............................. 84/612 |
| 2011/0199180 | A1* | 8/2011 | Holman ....................... 340/4.42 |
| 2012/0223885 | A1 | 9/2012 | Perez |
| 2012/0254757 | A1* | 10/2012 | Iriya et al. ..................... 715/716 |
| 2014/0337298 | A1* | 11/2014 | Kandekar et al. ............. 707/688 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Keith Ferguson
(74) *Attorney, Agent, or Firm* — Lee & Hayes, PLLC

(57) ABSTRACT

A broadcast radio architecture includes an internet-enabled radio and a remote audio services system. The internet-enabled radio receives broadcast audio content and plays through a speaker, the audio content that is received. The internet-enabled radio receives a user command to replay, from the beginning, a song that is currently being played. In response to the user command, the internet-enabled radio transmits over a network to the audio services system, a snippet of the song that is currently being played. Using the snippet of the song, the audio services system identifies a song from which the snippet was likely recorded and transmits a data stream that includes the song, in its entirety, back to the internet-enabled radio. To provide additional value, the audio services system may also identify and transmit to the internet-enabled radio, additional content that is deemed likely of interest to users interested in the identified song.

29 Claims, 6 Drawing Sheets

DIGITAL AUDIO SERVICES TO AUGMENT BROADCAST RADIO

BACKGROUND

Music is available to users over a wide range of devices, and has long been broadcast over radio frequency channels. Music may also be broadcast via multi-cast digital streaming. When enjoying music that is being broadcast, it can be frustrating to a user if the user begins listening while the broadcast is in the middle of a song or if the user is interrupted, and the user is unable to go back to the beginning of the song.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An architecture in which users can request to re-play a song that has been broadcast and in response, receive the song and other related content from a cloud-based service is described in this document. Broadcast music may be received at an internet-enabled radio or other device over a digital network, a broadcast radio frequency, or other broadcast means. While listening to a particular song, a user may submit a request to re-play, from the beginning, the song that is currently being received. The request, along with a snippet of the current song, may be transmitted to a network accessible computing platform, or "cloud-based service," which identifies and retrieves the current song based on the received snippet and identifies additional content that may be of interest to the user based on the user's perceived interest in the particular song. The cloud-based service then transmits the identified song and additional content to the device from which the request was received.

The architecture may be implemented in many ways. One illustrative implementation is described below in which the internet-enabled radio is implemented within an automobile. However, the architecture may be implemented in many other contexts and situations in which an internet-enabled device may receive broadcast music.

Illustrative Environment

Figure 1:
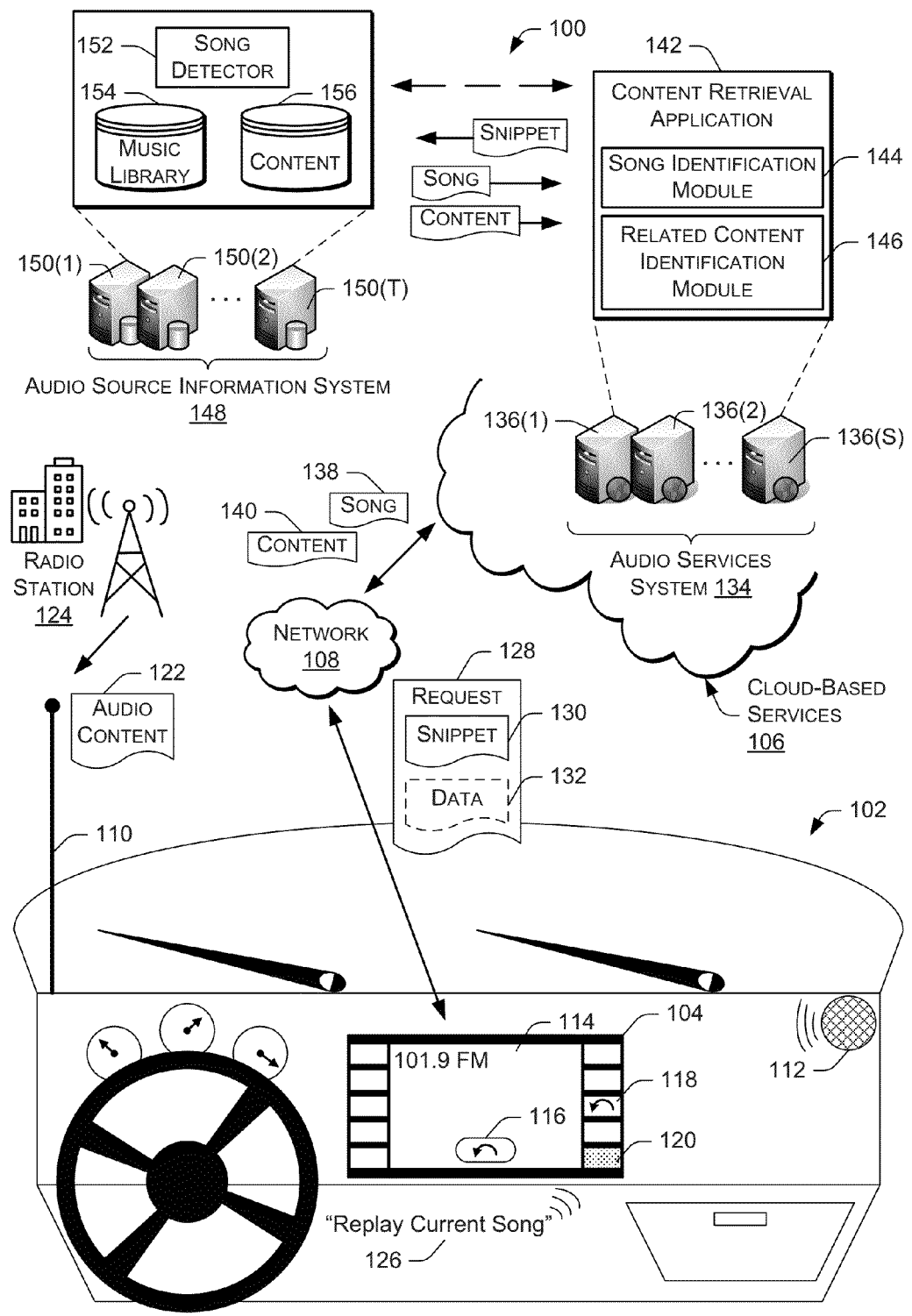
FIG. 1 shows an illustrative internet-enabled broadcast radio architecture set in an exemplary automobile environment. The architecture includes an internet-enabled radio physically situated in an automobile, and communicatively coupled to cloud-based services via a network.

FIG. 1 shows an illustrative internet-enabled broadcast radio architecture 100 set in an exemplary automobile environment 102. The architecture 100 includes an internet-enabled radio 104 physically situated in an automobile 102, and communicatively coupled to cloud-based services 106 over a network 108, e.g. the Internet. In the illustrated implementation, the internet-enabled radio 104 is integrated into the automobile 102, such as mounted in the dash of the automobile. In other implementations, the internet-enabled radio may be integrated into a personal computer, a laptop computer, a tablet computer, a cell phone, or other device. Alternatively, the internet-enabled radio may be a stand-alone device which may or may not be portable.

Generally, the internet-enabled radio 104 includes an antenna 110 for receiving broadcast radio content, a tuner for tuning to a particular radio frequency, and one or more speakers 112 for outputting received broadcast radio content. Internet-enabled radio 104 may also include any of a variety of interfaces for user input. For example, internet-enabled radio 104 may include a touch screen display 114 that displays a user interface that includes a touch-selectable button 116. Additionally or alternatively, internet-enabled radio 104 may include one or more selectable buttons 118 and/or a microphone 120 for receiving spoken user commands. One example implementation of the internet-enabled radio 104 is provided below in more detail with reference to FIG. 2.

In the illustrated example, audio content 122 is broadcast from a radio station 124 over a particular radio frequency. When the internet-enabled radio 104 is tuned to the particular radio frequency, the audio content 122 is received through the antenna 110 and played through the speakers 112. While listening to the broadcast audio content 122, a user may submit a command to replay from the beginning, a song that is currently playing. For example, the user may have just turned on the radio, and recognizes the current song as a personal favorite. Alternatively, the user may have been listening to the radio, but was interrupted (e.g., the user may have received a phone call, the user may have been interacting with an employee at a restaurant drive-through window, etc.). To replay the current song from the beginning, the user may submit the replay command to the internet-enabled radio 104 by selecting the button 116 on the touch-screen display, by selecting the hardware button 118, or by speaking a voice command 126 (e.g., "Replay Current Song") into the microphone 120.

In response to receiving the replay command, the internet-enabled radio transmits a request 128 that includes a snippet 130 of the song that is currently playing. Request 128 may also include additional data 132, examples of which are described in further detail below. In an example implementation, internet-enabled radio 104 includes one or more buffers that continuously record received broadcast audio content. When the replay command is received, the internet-enabled radio 104 creates song snippet 130 from data stored in the buffer. In an alternate implementation, rather than relying on a buffer, in response to receiving the replay command, the internet-enabled radio 104 begins recording the song snippet 130 from the audio content 122 that is being received. Song snippet 130 may be, for example, three to ten seconds in length. The internet-enabled radio 104 transmits the song snippet 130 over the network 108 to the cloud-based services 106.

As described above, the internet-enabled radio 104 may be integrated into an automobile (as illustrated in FIG. 1), or may be integrated into a personal computer, a laptop computer, a tablet computer, a cell phone, or other device. Alternatively, the internet-enabled radio may be a stand-alone device which may or may not be portable. Depending on the implementation, the internet-enabled radio 104 is communicatively coupled to the network 108 via wireless technologies (e.g., RF, cellular, satellite, Bluetooth, etc.), wired technologies (e.g., wires, USB, fiber optic cable, etc.), or other connection technologies. The network 108 is representative of any type of communication network, and may be implemented using a wired infrastructure (e.g., cable, CAT5, fiber optic cable, etc.), a wireless infrastructure (e.g., RF, cellular, microwave, satellite, Bluetooth, etc.), and/or other connection technologies. The network 108 carries data between the cloud services 106 and the internet-enabled radio 104.

The cloud services 106 generally refer to a network accessible platform implemented as a computing infrastructure of processors, storage, software, data access, and so forth that is maintained and accessible via a network such as the Internet. Cloud services 106 do not require end-user knowledge of the physical location and configuration of the system that delivers the services. Common expressions associated with cloud services include "on-demand computing", "software as a service (SaaS)", "platform computing", "network accessible platform", and so forth.

The cloud services 106 include an audio services system 134 that is implemented by one or more servers, such as servers 136(1), 136(2), . . . , 136(S). The servers 136(1)-(S) may host any number of applications that can process the song snippet received from the internet-enabled radio 104, and return the song 138 in its entirety and related content 140. These servers 136(1)-(S) may be arranged in any number of ways, such as server farms, stacks, and the like that are commonly used in data centers. One example implementation of the audio services system 134 is described below in more detail with reference to FIG. 3.

The audio services system 134 in the cloud-based services 106 hosts a content retrieval application 142 to identify and retrieve the requested song and to identify and retrieve additional content that is likely to be of interest to a user who is interested in the requested song. In the illustrated implementation, the content retrieval application 142 includes a song identification module 144 to process the received song snippet 130 to identify the requested song, and a related content identification module 146 to identify additional content that is in some way determined to be related to the requested song.

The song identification module 144 is configured to determine a song that includes the snippet received from the internet-enabled radio 104. There are many ways for the song identification module to make this determination. In one implementation, the song identification module 144 listens to the song snippet 130 and attempts to identify a signature of the song. The audio services system 134 may maintain a library of songs and evaluates the snippet relative to that collection.

In another implementation, the song identification module 144 may conduct searches at other resource systems accessible on the Internet. In FIG. 1, an audio source information system 148 is illustrated as a separate online resource for identifying songs. The audio source information system 148 may be implemented as a website accessible over the Internet or a private resource accessible by a private network, or over a public network using secure access credentials. The audio source information system 148 has one or more servers 150(1), 150(2), . . . , 150(T) that host various applications that may be used to determine a song, including song detector 152.

In one scenario, the song identification module 144 may conduct a web search for an audio signature of a song snippet by sending a query to the audio source information system 148. The song detector 152, executing on the servers 150(1)-(T), may analyze the song snippet and attempt to identify a match. As one example, the application 152 may be implemented as a music identification application, such as Shazam™, that identifies the song, track, and/or artist associated with the song snippet 130.

Once the song is identified, the song is retrieved, e.g., from the music library 154, to be streamed from the audio services system 134 to the internet-enabled radio 104 over network 108.

Related content identification module 146 identifies additional content based on the identified song. For example, related content identification module 146 may request related content from the content store 156 of the audio source information system 148. Alternatively, related content identification module 146 may execute one or more information searches based on the identified song to identify additional content in which a user interested in the identified song is likely to be interested. Related content identification module 146 may also consider additional data 132 that may have been received with request 128. For example, additional data 132 may include location data, date/time information, and/or user profile data that may indicate, for example, user demographics (e.g., a user's gender, age, etc.), prior music purchases, previous requests to replay a song, user preferences, and so on. In an alternate implementation, additional data 132, or portions thereof may be maintained by cloud-based services 106. In such an implementation, the additional data 132 may be available to audio services system 134 without the additional data 132 being sent as part of the request 128.

The additional content 140 represents any variety of data, which may include, but is not limited to, news articles, social media postings, music recommendations, product recommendations, concert ticket offers, and advertisements. The additional content 140 may be identified based on any combination of song metadata (e.g., title, artist, album, genre, song personality). Furthermore, the additional content 140 may be identified based on other data 132.

When the internet-enabled radio 104 receives the song 138 and the additional content 140, the radio stops playing the broadcast audio content 122 that is being received, and begins playing the song 138. The radio 104 may receive the additional content 140 before, during, or after receiving the song 138, and may present the additional content 140 before, during, or after playing the song 138.

For example, in response to a request 128 to replay a particular song, internet-enabled radio 104 may present an advertisement (e.g., for a cologne that bears the artist's name) prior to playing the song. Such an advertisement may be presented as video and/or audio. As another example, in response to a request 128 to replay a particular song, internet-enabled radio 104 may play the song 138 and then present a recommendation (e.g., a recommendation to tune to a particular radio frequency over which audio content similar to song 138 is typically broadcast, or a recommendation to purchase and download a digital copy of the song or an album that includes the song).

Illustrative Internet-Enabled Radio

Figure 2:
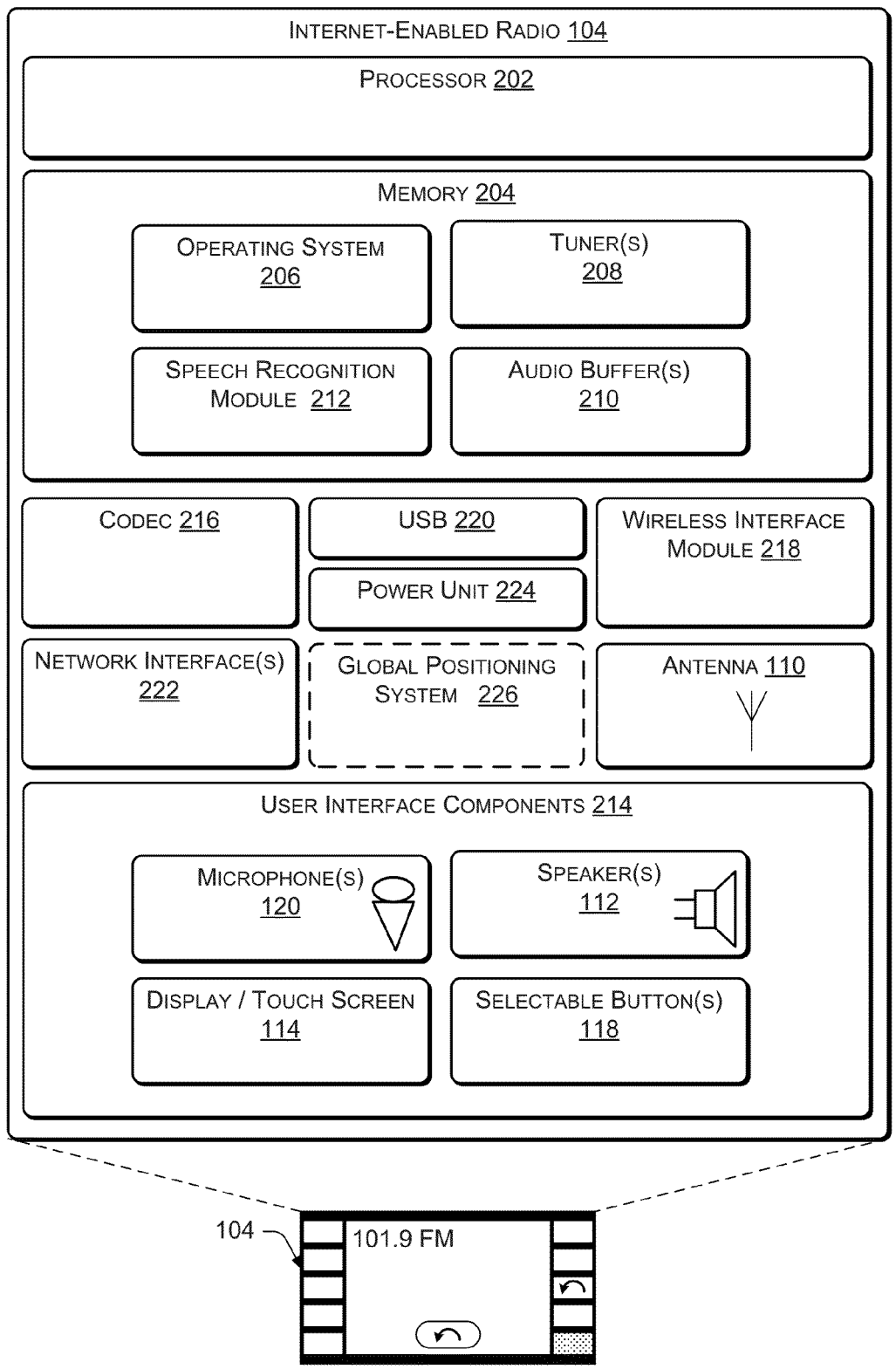
FIG. 2 shows a block diagram of selected functional components implemented in the internet-enabled radio of FIG. 1.

FIG. 2 shows selected functional components of the internet-enabled radio 104 in more detail. As described above, the internet-enabled radio 104 may be integrated into another device (e.g., an automobile, a desktop computer, a laptop computer, a tablet computer, a cell phone, etc.) or may be implemented as a standalone device that may or may not be portable.

In the illustrated implementation, the internet-enabled radio 104 includes a processor 202 and memory 204. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instructions, datastores, and so forth may be stored within the memory 204 and configured to execute on the processor 202. An operating system module 206 is configured to manage hardware and services (e.g., wireless interface module, USB, Codec, input/output interfaces) within and coupled to the radio 104 for the benefit of other modules. One or more tuners 208 enable the internet-enabled radio 104 to receive content from various sources. For example, a particular tuner 208 may enable the radio to receive audio content over a particular radio-frequency. One or more audio buffers 210 are configured to record broadcast audio content received via the tuner(s) 208. A speech recognition module 212 provides speech recognition functionality to support receipt of user-submitted voice commands.

The internet-enabled radio 104 includes a variety of user interface components 214. The user interface components may include, for example, a display or touch screen 114, one or more selectable buttons 118, one or more microphones 120 to receive audio input, such as user voice input, and one or more speakers 112 to output audio sounds, such as received broadcast radio content. A codec 216 is coupled to the microphone 120 and speaker 112 to encode and/or decode the audio signals. The codec may convert audio data between analog and digital formats. A user may interact with the radio 104 by speaking to it, and the microphone 120 captures the user speech. The codec 216 encodes the user speech and transfers that audio data to other components.

The internet-enabled radio 104 includes a wireless interface module 218 coupled to an antenna 110 to facilitate a wireless connection to a network. The wireless interface module 218 may implement one or more of various wireless technologies, such as wife, Bluetooth, RF, and so on.

A USB port 220 may further be provided as part of the radio 104 to facilitate a wired connection to a network, or a plug-in network device that communicates with other wireless networks. In addition to the USB port 220, or as an alternative thereto, other forms of wired connections may be employed, such as a broadband connection. Network interface(s) 222 represent interfaces that enable the radio 104 to send and/or received data over any other type of network. A power unit 224 is further provided to distribute power to the various components of the radio 104.

In an example implementation, internet-enabled radio 104 may also include a global positioning system (GPS) 226 that tracks a current location of the internet-enabled radio. Alternatively, internet-enabled radio 104 may include an interface to a separate GPS that may be integrated, for example, into the automobile 102.

Illustrative Cloud Services

Figure 3:
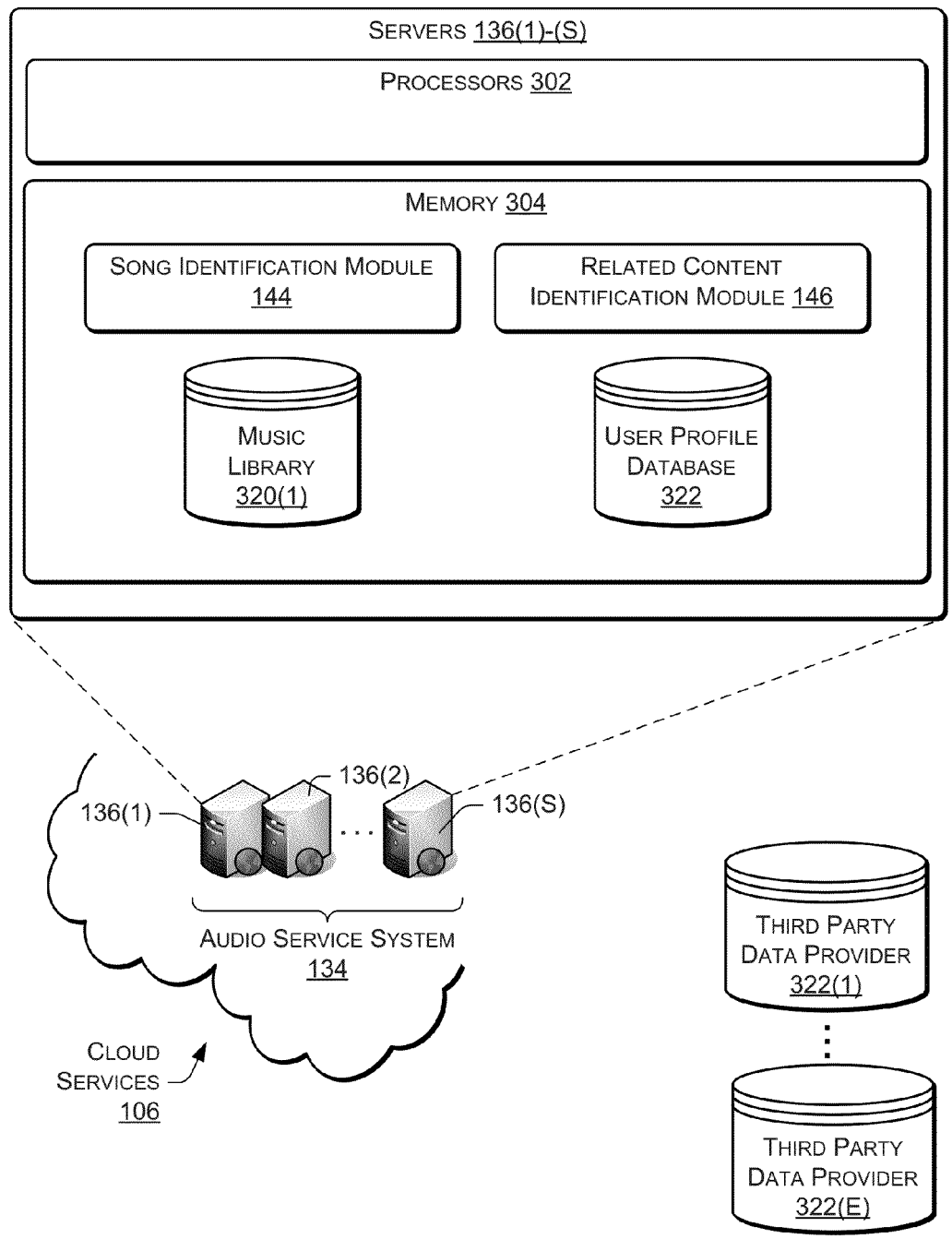
FIG. 3 shows a block diagram of a server architecture implemented as part of the cloud-based services of FIG. 1.

FIG. 3 shows selected functional components of a server architecture implemented by the audio services system 134 as part of the cloud services 106 of FIG. 1. The audio services system 134 includes one or more servers, as represented by servers 136(1)-(S). The servers collectively comprise processing resources, as represented by processors 302, and memory 304. The memory 304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In the illustrated implementation, the song identification module 144 and related content identification module 146 are shown as software components or computer-executable instructions stored in the memory 304 and executed by one or more processors 302. The song identification module 144 receives the request 128 from the internet enabled radio 104 and identifies the song from which the snippet 130 was extracted. The song identification module 144 may try to determine the song locally by querying a local music library 306, or may alternatively query other resources on the web, such as third party data provider 322, to attempt to identify the song associated with the snippet.

The related content identification module 146 identifies additional content in which a user will likely be interested, based on a perceived user interest in the song identified by the song identification module 144. For example, the related content identification module 146 may submit one or more queries to one or more third party data providers 322(1)-(E) to identify content related to the identified song. Additionally or alternatively, the related content identification module 146 may submit queries based on combinations of the song and one or more other pieces of information. The other pieces of information may include user profile information, location information, past user behavior, purchase history, and so on. For example, user profile information may be maintained by the audio service system in a user profile database 322. Alternatively, user profile information and/or other data (e.g., location data) may be received as part of the request to replay the song.

Based on the identified song and the other information that may be available, the related content identification module 146 identifies the additional content to be returned with the requested song. The additional content may include music recommendations, product recommendations, advertisements, an offer to purchase and download the song, an instruction to the internet-enabled radio to automatically tune to a channel that broadcasts similar music, and so on.

The related content identification module 146 may further use location information received from the GPS 226 of the internet-enabled radio 104 to determine the type of additional content to return to the user. The GPS information may be used to identify location of the user, as well as location of places or entities that may be relevant to the user and/or the requested by the user. Suppose, for example, that the user is driving the automobile 102 through a particular area having a music store. When the user requests to hear a particular song in that neighborhood, the related content identification module 146 may identify the local music store and offer the user a special discount to purchase the CD containing the song that the user requested. Along with the discount, the related content identification module 146 may find directions to the music store. Thus, the module 146 coordinates location with special offers.

Once the song and the related content are identified, audio services system 134 transmits the song and the related content over network 108 to internet-enabled radio 104. In an example implementation, the song and the related content are streamed to the radio 104. In an alternate implementation, the song may be streamed and the related content may be transmitted separately. For example, presentation of the related content on the radio may occur through display of a particular website (e.g., through which a user can purchase tickets to an upcoming concert).

Illustrative Process

Figure 4:
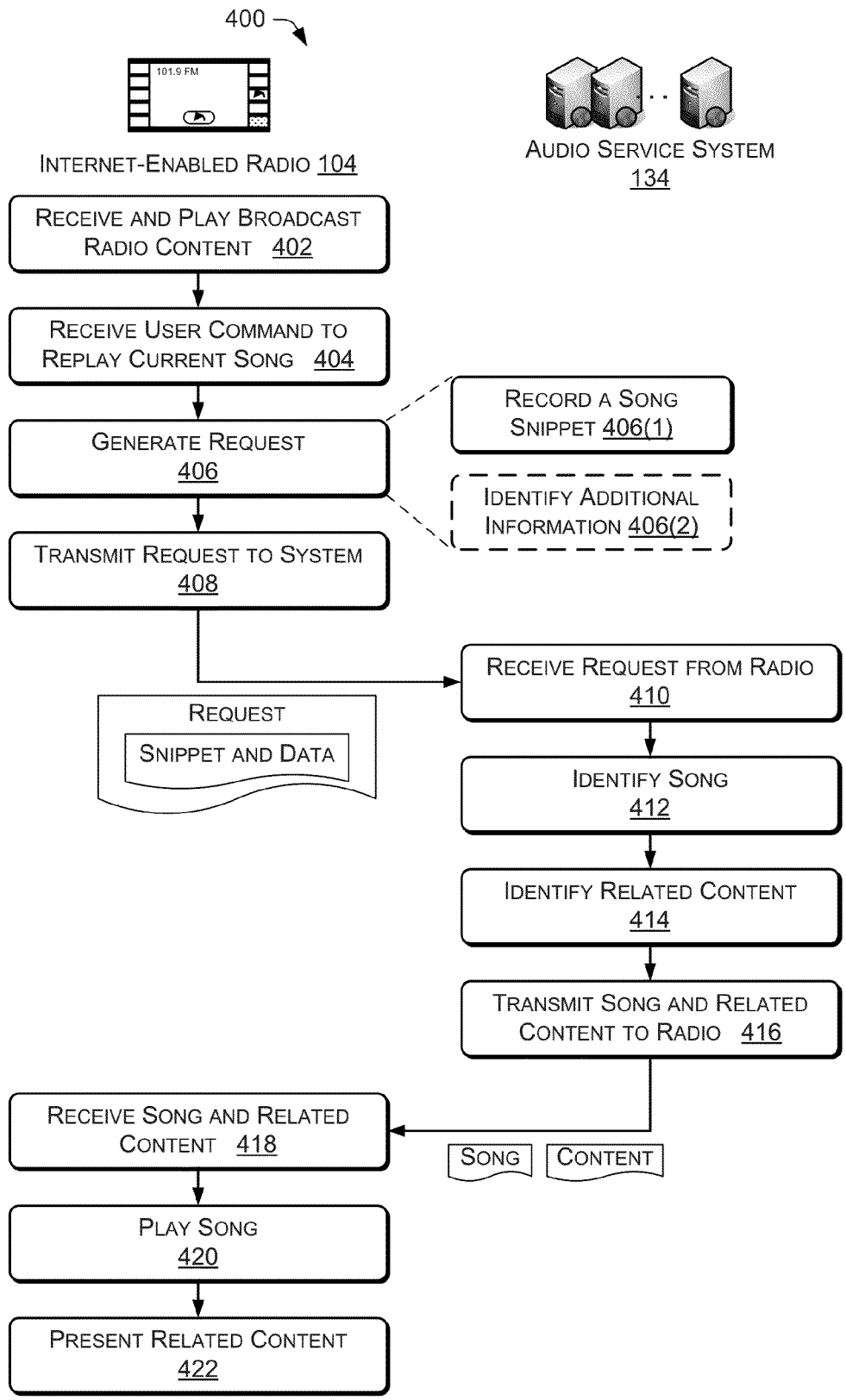
FIG. 4 presents a flow diagram showing an illustrative process of replaying a song that is currently being broadcast and presenting related content through an internet-enabled radio of FIG. 1.
Figure 5:
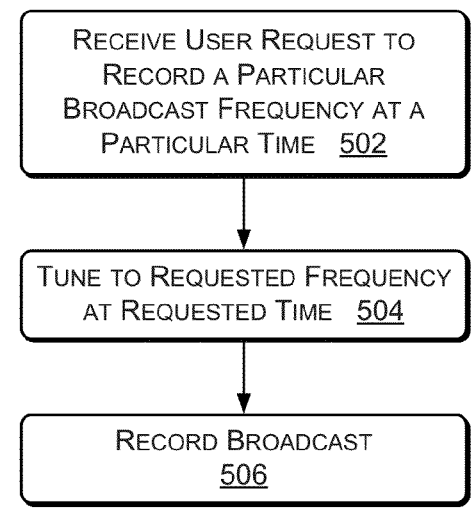
FIG. 5 presents a flow diagram showing an illustrative process of receiving a request to record a broadcast and subsequently playing the recorded broadcast.
Figure 6:
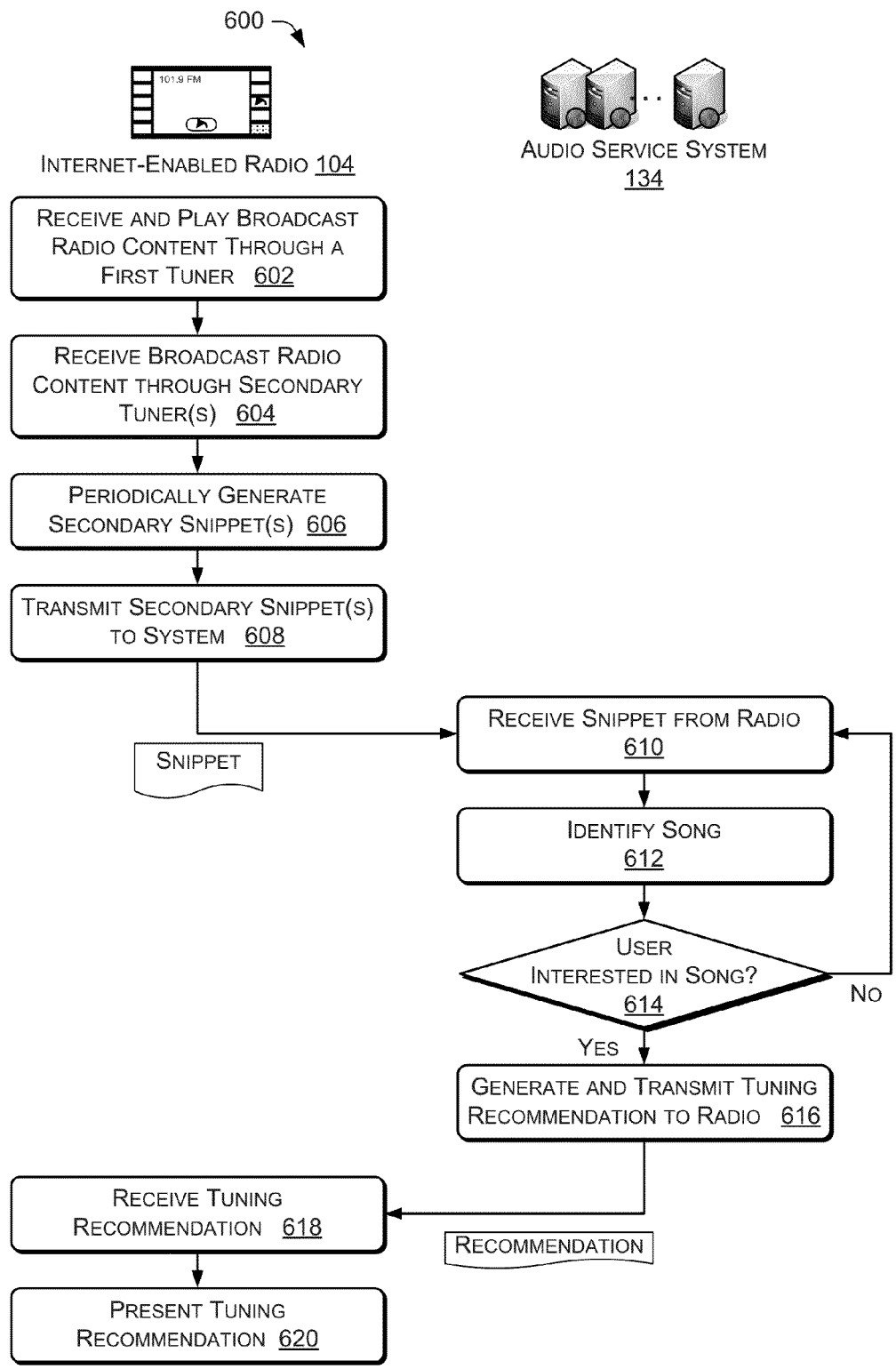
FIG. 6 presents a flow diagram showing an illustrative process of presenting a tuning recommendation based at least partly on a snippet of a song.

FIG. 4 shows an illustrative process 400 for enabling replay of a broadcast song using an internet-enabled radio 104. The processes may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

For purposes of describing one example implementation, the blocks are arranged visually in FIG. 4 in columns beneath an internet-enabled radio 104 and the audio services system 134 to illustrate what parts of the architecture may perform these operations. That is, actions defined by blocks arranged beneath the internet-enabled radio may be performed by the radio, and similarly, actions defined by blocks arranged beneath the audio services system may be performed by the system.

At 402, the internet-enabled radio 104 receives broadcast audio content and plays the content as it is received. For example, as illustrated in FIG. 1, the audio content 122 is broadcast from the radio station 124 and is received through the antenna 110 by the internet-enabled radio 104. In an alternate example, the audio content may be broadcast over another type of network such as, for example, network 108.

At 404, the internet-enabled radio 104 receives a user command to replay a song that is currently playing. A user may submit the replay command to the internet-enabled radio 104 in any number of ways, including, but not limited to, as a voice command through microphone 120, by selecting a button 116 displayed on a touch screen, or by selecting a hardware button 118 on the radio.

At 406, the internet-enabled radio 104 generates a song replay request based on the received user command. The generated request includes a song snippet, as represented by 406(1), and may also include additional information, as represented by 406(2).

At 406(1), the internet enabled radio 104 records a song snippet. In an example implementation, as broadcast audio content 122 is received, the audio content is recorded to an audio buffer 210. When a user request to replay the song is received, data from the buffer is extracted to form the song snippet, including, for example, the last few seconds of the broadcast. In another example implementation, rather than continuously recording the broadcast audio content to the buffer, the internet-enabled radio 104 begins recording the broadcast audio content when the user command to replay the song is received.

At 406(2), the internet enabled radio 104 may identify additional information to be included in the request. Example implementations may include any of a variety of types of information with the request, such as, for example, user profile data that indicates any combination of user information (e.g., age, gender, user preferences, etc.), prior purchase information (e.g., song downloads, concert ticket purchases, product purchases, etc.), location information (e.g., global-positioning-system data), and so on.

At 408, the request (including the song snippet and optional additional information) is transmitted over the network 108, to the audio service system 134 in the cloud services 106. At 410, the audio service system 134 receives the request from the internet-enabled radio 104.

At 412, the audio service system 134 identifies a song from which the snippet was likely recorded. In one approach, the system 134 may compare the song snippet 128 to data in a local music library. Alternatively, the system 134 may conduct a web search for an audio signature of the song snippet by sending a query to the audio source information system 148 that employs a song detector application 152, such as Shazam™, to analyze the song snippet and identify a match.

At 414, the audio service system 134 identifies content related to the song that was identified at 412. As described above, the related content may include a variety of types of content including, but not limited to, music recommendations, product recommendations, and advertisements. The related content may be identified as a result of searches based on any combination of the identified song and the additional information that is available (e.g., user profile data, location data, etc.).

At 416, the audio service system 134 transmits the identified song and the related content to the internet-enabled radio. At 418, the internet-enabled radio 104 receives the song and the related content.

At 420 and 422, the received song is played, and the related content is presented through the internet-enabled radio.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   at a client radio device:
      receiving broadcast audio content that includes a song;
      playing the song from the broadcast audio content;
      receiving a command from a user to replay the song from a beginning of the song;
      storing a snippet of the song;
      transmitting a replay request to a remote server, the replay request including the snippet of the song;
   at the remote server:
      receiving the replay request including the snippet of the song;
      using the snippet of the song to identify the song;
      determining additional content likely to be of interest to the user;
      transmitting, to the client radio device, a data stream that includes the song and the additional content.

2. The method as recited in claim 1, wherein the additional content is determined based at least in part on one or more of:
(1) an attribute of the song;
(2) user demographic data;
(3) user preferences;
(4) song replay requests;
(5) user purchase data; or
(6) a current location of the client radio device.

3. The method as recited in claim 1, wherein the additional content comprises one or more of:
(1) a recommendation to listen to another song that is indicated as being similar to the song;
(2) a recommendation to tune to a broadcast channel that broadcasts music that is indicated as being similar to the song;
(3) an advertisement;
(4) an offer to purchase a product associated with an artist of the song;
(5) an offer to purchase and download the song; or
(6) an offer to purchase and download an album containing the song.

4. A method comprising:
receiving, from a remote device, a request to play, from a beginning, content that is at least one of currently being played or was previously played, the request including first data representing a snippet of the content;
based at least partly on the first data representing the snippet, identifying the content from which the snippet was recorded; and
transmitting second data representing at least one of a portion of the content or additional content that is associated with the content.

5. The method as recited in claim 4, further comprising:
based at least partly on identification of the content, determining additional information in which a user associated with the remote device is likely to be interested; and
transmitting the additional information to the remote device along with the second data.

6. The method as recited in claim 5, wherein determining the additional information in which the user is likely to be interested comprises:
determining an attribute of the content; and
determining the additional information based at least in part on the attribute of the content.

7. The method as recited in claim 6, wherein the attribute of the content comprises one or more of:
(1) an artist;
(2) a genre;
(3) a mood; or
(4) an album.

8. The method as recited in claim 5, wherein determining the additional information in which the user is likely to be interested comprises:
determining a user profile associated with the remote device; and
identifying the additional information based at least in part on the user profile.

9. The method as recited in claim 8, wherein determining the user profile associated with the remote device comprises receiving user profile data from the remote device.

10. The method as recited in claim 9, wherein the request further includes the user profile data.

11. The method as recited in claim 8, wherein the user profile comprises one or more of:
(1) user demographic data;
(2) user preferences;
(3) content replay requests; or
(4) purchase data associated with the user.

12. The method as recited in claim 5, wherein determining the additional information in which the user is likely to be interested comprises:
determining a current location of the remote device; and
identifying the additional information based at least in part on the current location of the remote device.

13. The method as recited in claim 12, wherein determining the current location of the remote device comprises receiving location information from the remote device using a global positioning system.

14. The method as recited in claim 13, wherein the request further includes the location information.

15. The method as recited in claim 5, wherein the additional information comprises one or more of:
(1) a recommendation to listen to another content that is indicated as being similar to the content;
(2) a recommendation to tune to a broadcast channel that broadcasts other content that is indicated as being similar to the content;
(3) an advertisement;
(4) an offer to purchase a product associated with an artist of the content;
(5) an offer to purchase and download the content; or
(6) an offer to purchase and download an album containing the content.

16. A device comprising:
an interface to receive broadcast audio content;
a speaker to output the broadcast audio content as the broadcast audio content is received;
a user interface to receive a command to replay, from a beginning, a song being output as part of the broadcast audio content;
an audio content buffer to store a snippet of the song; and
a network interface to:
transmit a request to replay the song, the request including the snippet; and
receive a data stream that includes the song.

17. The device as recited in claim 16, wherein the broadcast audio content is broadcast over a radio frequency and the interface to receive the broadcast audio content comprises a radio-frequency antenna and a tuner.

18. The device as recited in claim 16, wherein the user interface comprises a microphone and the command to replay the song is received as a voice command.

19. The device as recited in claim 16, wherein the user interface comprises a hardware button for inputting a replay command.

20. The device as recited in claim 16, wherein the user interface comprises a touch screen displaying a touch-selectable button.

21. The device as recited in claim 16, wherein at least one of the audio content buffer or a second audio content buffer is configured to continuously record the broadcast audio content as the broadcast audio content is received.

22. The device as recited in claim 16, wherein the audio content buffer is configured to begin recording the broadcast audio content in response to the user command being received.

23. The device as recited in claim 16, wherein the network interface comprises a wireless interface module to facilitate communication with a wireless network.

24. An audio services system comprising:
one or more processors;
memory accessible by the one or more processors;
a module stored in the memory and executable on the one or more processors to:
receive, from a remote device, a request to replay, from a beginning, content, the request including data representing a snippet of the content; and based at least partly on the data representing the snippet, identify the content from which the snippet was recorded; and a network interface to transmit a data stream including at least a portion of the content.

25. The audio services system as recited in claim 24, further comprising:

a related content identification module stored in the memory and executable on the one or more processors to determine, based at least in part on one or more attributes of the content, additional content that is likely to be of interest to a user associated with the remote device; and wherein the data stream that includes the at least the portion of the content further includes the additional content.

26. One or more non-transitory computer readable media storing instructions that, when executed on one or more processors, perform operations comprising:

receiving broadcast audio content;

playing a song from the broadcast audio content;

receiving a request to replay from a beginning, the song being played, the request including a snippet of the song being played;

storing the snippet of the song being played;

analyzing the snippet to identify the song from which the snippet was recorded;

receiving a data stream that includes the song that was identified from the snippet; and playing, from the beginning, the song from the data stream.

27. The one or more non-transitory computer readable media as recited in claim 26, wherein:

the receiving and playing the broadcast audio content, the receiving the request, the storing the snippet, the receiving the data stream, and the playing, from the beginning, the song are performed by a first device at a first location; and the snippet is analyzed by a second device at a second location.

28. The one or more non-transitory computer readable media as recited in claim 26, further comprising:

determining additional information separate from the song; and presenting the additional information in addition to playing the song.

29. The one or more non-transitory computer readable media as recited in claim 28, wherein the additional information includes at least one of recommendations, directions, offers to purchase, or advertisements.

\* \* \* \* \*